United States Patent [19]

Lioret et al.

[11] Patent Number: 4,833,321

[45] Date of Patent: May 23, 1989

[54] PROCESS FOR INSTALLING A PROBE FOR MONITORING THE POSITION OF AN INTERFACE BETWEEN TWO FLUIDS AND MEANS FOR IMPLEMENTING SAID PROCESS

[75] Inventors: Jean-Claude Lioret, Paris; Christian Bonnaure, Lambersart, both of France

[73] Assignee: Gaz de France, Paris, France

[21] Appl. No.: 16,608

[22] Filed: Feb. 19, 1987

[30] Foreign Application Priority Data

Feb. 20, 1986 [FR] France ................................ 86 02315

[51] Int. Cl.⁴ .......................... G01V 5/12; G01F 23/00
[52] U.S. Cl. .................................. 250/258; 250/357.1; 378/86
[58] Field of Search .............................. 250/258, 357.1; 73/290 R; 378/86, 89

[56] References Cited

U.S. PATENT DOCUMENTS 2,565,963 8/1951 Graham ................................ 378/52
2,775,121 12/1956 Bennett et al. ...................... 250/258
2,972,679 2/1961 Caldwell et al. .................... 250/258

FOREIGN PATENT DOCUMENTS 1221165 7/1966 Fed. Rep. of Germany .

Primary Examiner—Carolyn E. Fields
Attorney, Agent, or Firm—Pollock, Vande Sande & Priddy

[57] ABSTRACT

This invention relates to a system for monitoring, in a cavity in the earth, the position of, or changes in the position of, an interface between two immiscible liquids of different densities. In accordance with the invention, two pipes, one positioned within the other to form a space between them, extends into the cavity in the earth. A probe is mounted on the outer wall of the inner pipe and is vertically positioned near the interface to be monitored. The probe includes an emitting source and a detector-receiver and readings are taken of signals received by the detector after emission by the source and at least partially reflected by at least one of the liquids. From the readings the position of or change in interface may be computed since the signal reading will vary as a function of the relative position of the probe and the interface. The invention may be applied to the monitoring of excavations of underground salt cavities.

3 Claims, 4 Drawing Sheets

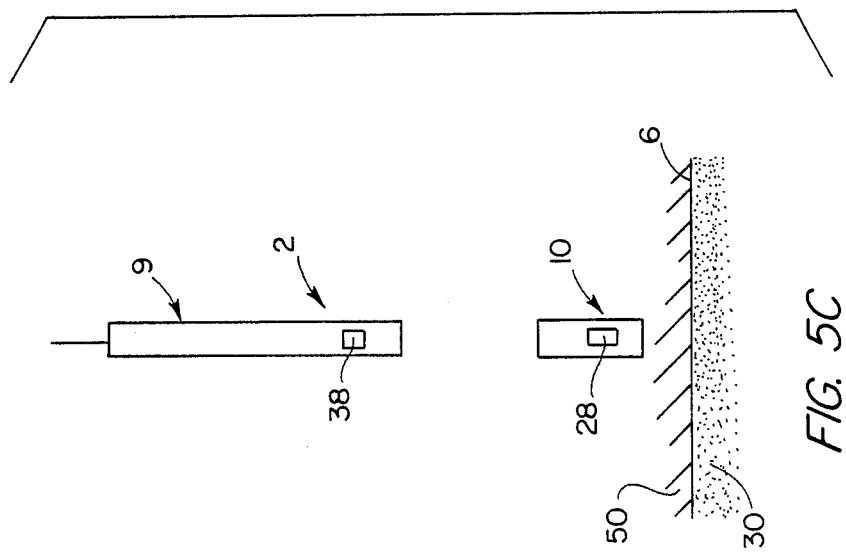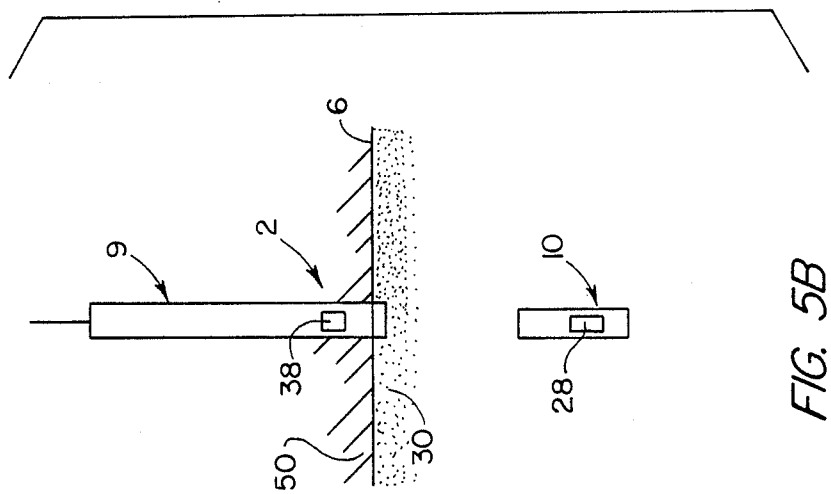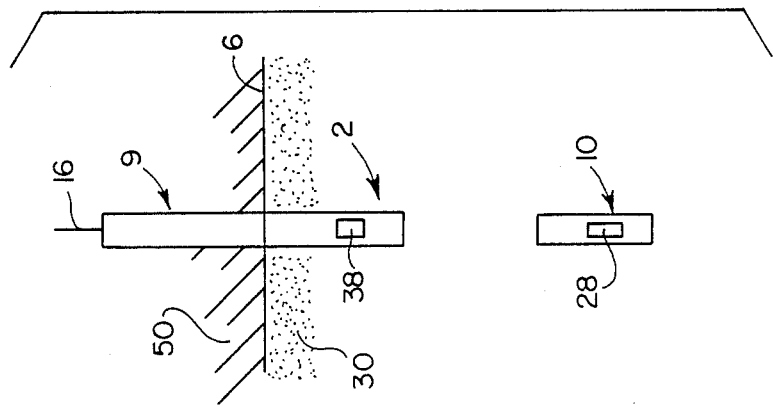

PROCESS FOR INSTALLING A PROBE FOR MONITORING THE POSITION OF AN INTERFACE BETWEEN TWO FLUIDS AND MEANS FOR IMPLEMENTING SAID PROCESS

FIELD OF THE INVENTION

The invention concerns a process and means for monitoring the position of changes in the position of the interface between two fluids of different densities.

More specifically, the invention relates to a process for installing the probe used to monitor the interface formed when excavating a salt cavity by means of leaching, with said cavity being at least partially filled with one or more of the abovementioned fluids.

BACKGROUND OF THE INVENTION

For such applications, it is essential to know the position or variation in position of the interface between the two fluids in order to be able to determine the depth the excavation has reached (the excavation generally proceeds from the bottom toward the surface) and so monitor the development of the cavity.

It will be noted that the fluids present in the cavity are often fuel oil (in the top portion) and brine (in the lower portion), with the brine formed from water injected under appropriate pressure.

Similar monitoring processes already exist in which the fluids in question move through one and/or another of two pipes leading to and/or from the cavity. The two pipes generally extend concentrically into the cavity, one inside the other.

The probe, in such known means, is usually connected to a stationary exterior point by a cable link from which it is suspended. Said probe generally comprises at least one signal-emitting source and at least one detector-receiver.

With such means, readings of the position of the interface are usually done by logging, which involves:

The use of a complete on-site logging unit (mobile laboratory and specialized team) for each movement in the position of the fluids if the probe is to be accurately positioned at the spot in which the measurements are to be made;

The permanent presence of probe and cable inside the center pipe.

In practice, such an arrangement of the probe within the central pipe may prove fatal. This is so particularly when one seeks to monitor a salt cavity formed by a technique known as reverse leaching, which is in itself known.

In such applications, saturated brine to be removed moves through the inner pipe. The presence of measuring instruments inside the pipe impedes proper flow. The resulting losses of head are too high. In addition, probe and cable tend to wear out prematurely because of the salt in the brine.

SUMMARY OF THE INVENTION

The invention resolves these problems by proposing to place the measuring probe and its cable in the intermediary space between the inner and outer pipes.

This provides a radical solution to the problems of head loss and corrosion.

It is worth noting in this regard that the substance that moves through the annular space separating the two pipes is generally the water being used to excavate the cavity.

In practice, the invention provides that the probe should be installed in said intermediary space in the following way:

the probe is essentially fastened against a portion of the outer wall of the inner pipe, following which the section of the inner pipe carrying the probe is positioned near the spot at which one seeks to take measurements.

Probe and cable therefore form part of the stationary equipment. They can be positioned at the desired location for an indeterminate length of time. Furthermore, the services of a specialized team to maneuver the probe are no longer required.

The invention also concerns means for implementing the process that has just been presented.

In the particular application of the means to the excavation of cavities, notably salt cavities, the process of monitoring the progress of the work obviously requires that each borehole be equipped with the monitoring means of the invention.

The invention and more of its purposes, details, and advantages will appear more clearly and be better understood in light of the following explicative description, which is provided solely by way of example and with reference to the attached nonlimitative drawings.

BRIEF DESCRIPTION OF THE FIGURES

FIGS. 5A, 5B, and 5C illustrate the different relative positions that may be assumed by the monitoring probe and the interface.

DETAILED DESCRIPTION OF THE PREFERRED EMBODIMENT

Figure 1:
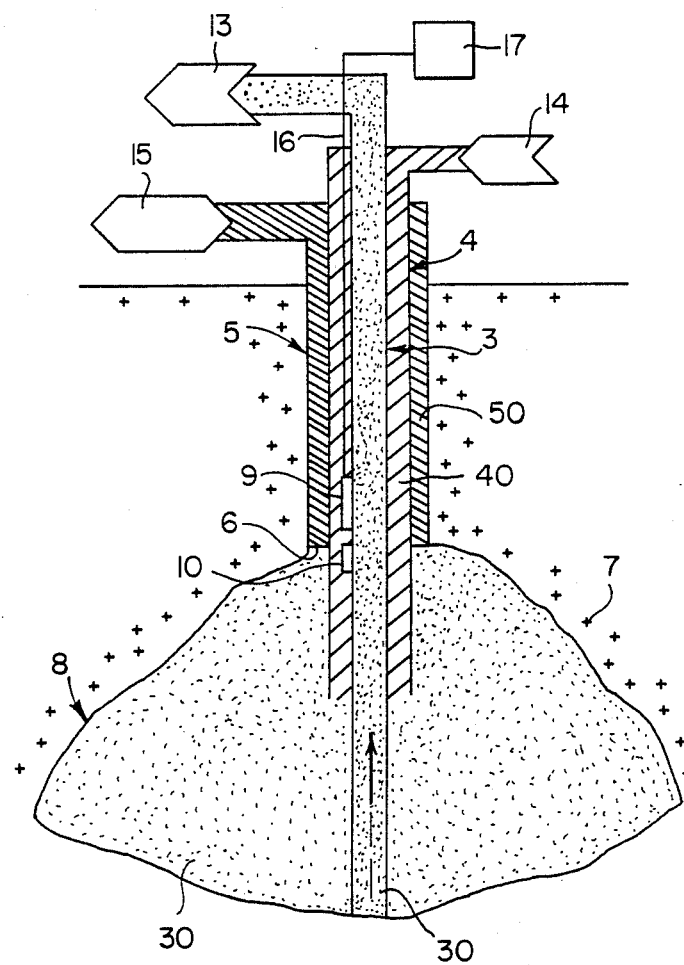
FIG. 1 is a partially schematic cross-section of an underground cavity in the process of being excavated, showing the location of the monitoring means of the invention.

FIG. 1 shows a salt cavity 8 for the surveillance of which the control means of the instant invention are particularly suited and necessary if one is to know the location or movement of the interface 6 between the nonmiscible fluids 30, 50 of different densities present in the cavity.

It should be noted at the outset that knowing the position of interface 6 enables the operators to monitor the excavation of cavity 8.

The leaching process used to form cavity 8 will not be described since it is not one of the objects of the invention and is furthermore in itself known.

It will be noted simply that FIG. 1 offers a schematic representation of two pipes--an inner pipe 3, and an outer pipe 4--which enter cavity 8 through access shaft 5. According to he excavation process adopted, pipe 3 contains freely circulating, unobstructed brine 30 in the process of being raised to the surface and evacuated at 13. The brine was drawn off from the cavity at a given depth. Outer pipe 4 handles water 40, moving it into cavity 8 from supply point 14. Said water is used for excavating the cavity and, after mixing with the salt elements of underground formation 7, forms brine 30.

As FIG. 1 clearly shows, the upper portion of the outer wall of pipe 4, i.e, that portion located substantially at the level of shaft 5, is bathed in a liquid 50 having a density lower than that of brine 30 and not miscible with it. Fluid 50 may be fuel oil, which is fed into and withdrawn from shaft 5 at 15.

In order to facilitate understanding of the manner in which the various fluids circulate through the pipes, their direction of flow is indicated by arrows in FIG. 1.

On one section of the outer wall of pipe 3 and in the proximity of interface 6 are fastened a source 10 and a detector 9. The detector is linked by cable 16 to a receiving/analyzing unit 17 on the surface.

Source 10 and detector 9 are the basic elements of the means 1 of the invention. Said means, which are particularly well suited for monitoring the movement or position of the interface 6 between two fluids 30, 50, are shown in detail in FIG. 2. They are composed primarily of a measuring probe, labeled 2, consisting essentially of emitting source 10 and detector-receiver 9. Detector 9 and source 10 are separated from each other by a set distance d. Advantageously, source 10 and detector-receiver 9 are offset vertically and aligned in a direction that is substantially parallel to the axes of pipes 3 and 4. Said axes 23, 24 are substantially parallel.

Between pipes 3 and 4 lies an annular space 19 that is wide enough to accommodate detector 9, source 10, and their fasteners. In the application selected, said fasteners are means that hold the probe in a fixed position, at least with respect to inner pipe 3. The probe is therefore fastened to outer wall 3a of said inner pipe.

Figure 2:
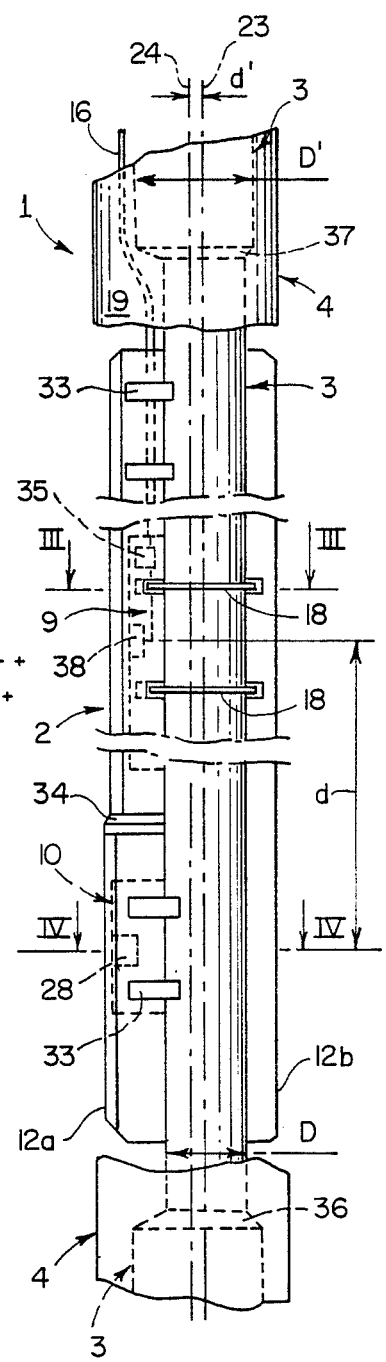
FIG. 2 is an axial schematic view, cut away to show the constituent parts of the monitoring means of the invention.
Figure 3:
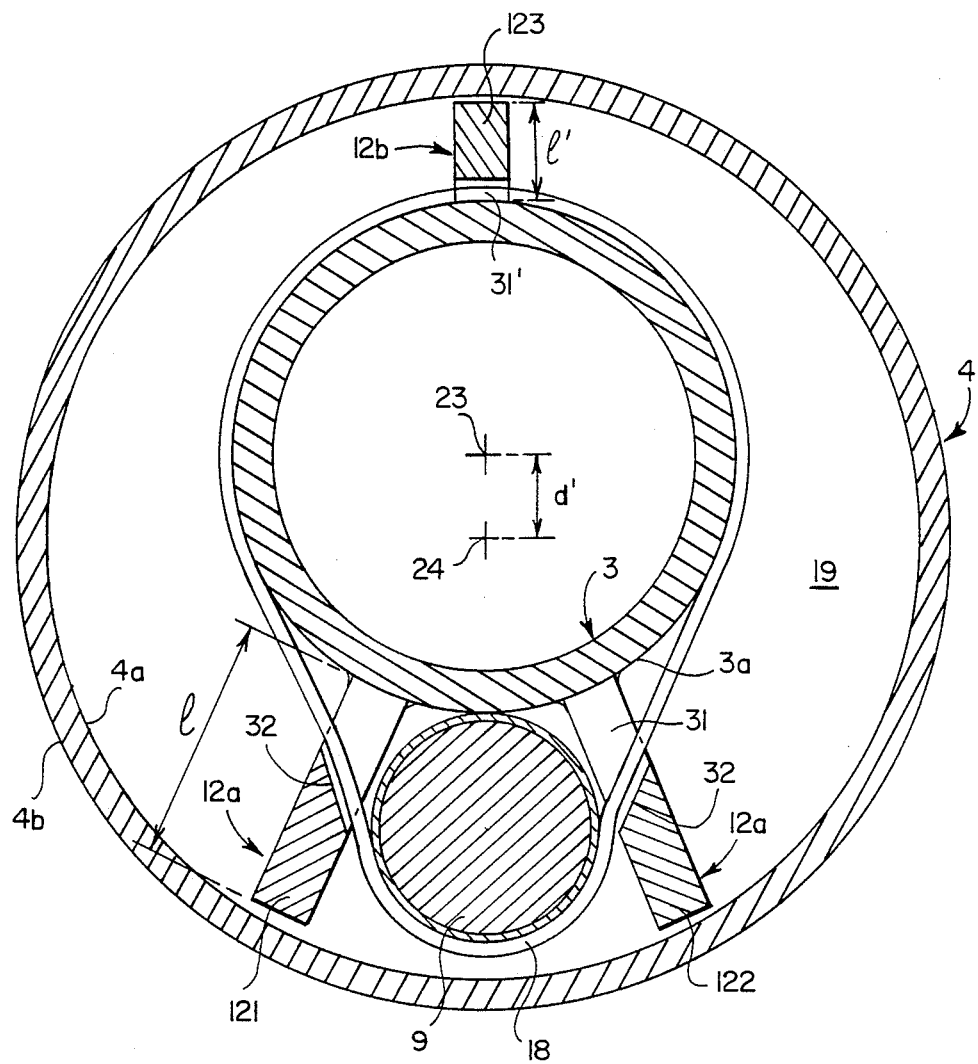
FIG. 3 is a cross-section along line III—III of FIG. 2, showing the position of the detector.
Figure 4:
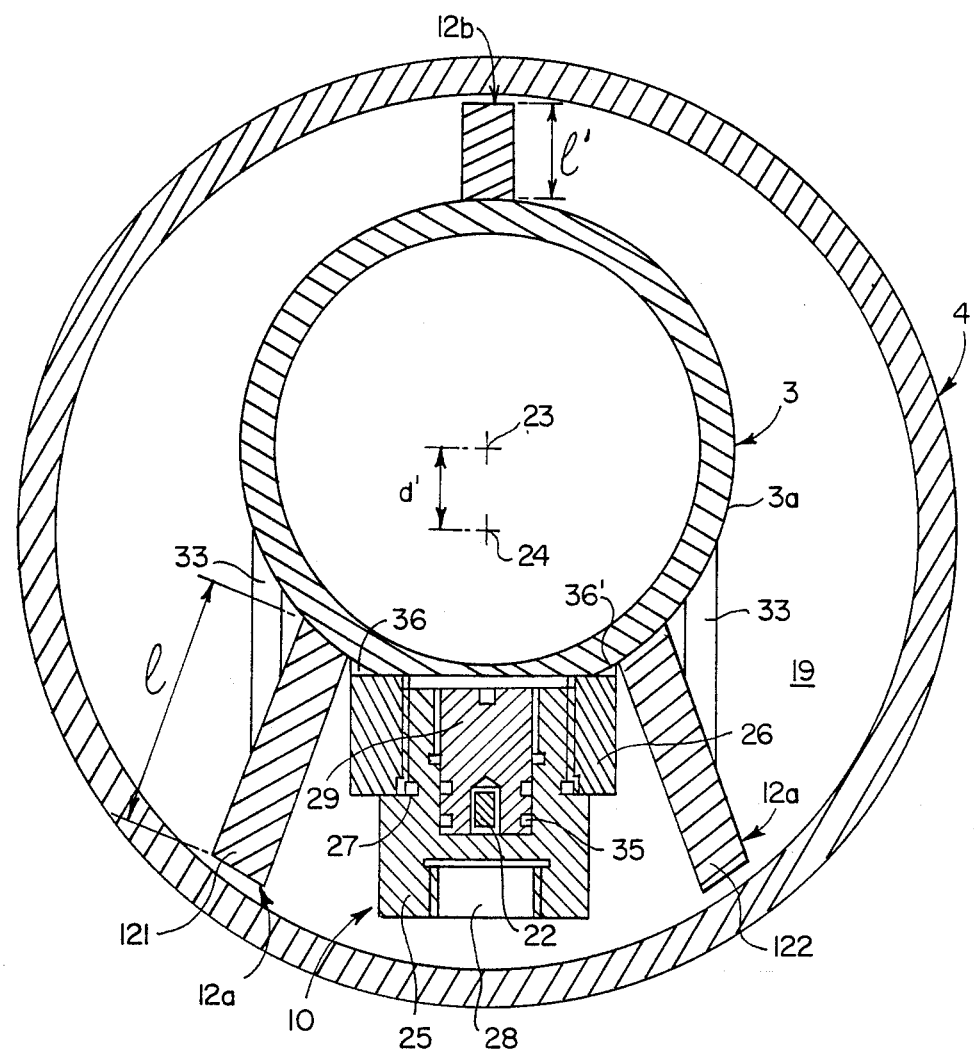
FIG. 4 is a cross-section along line IV—IV of FIG. 2, illustrating the position of the emitting source.

In addition, probe assembly 2, composed of source, detector, and cable link 16, is separated from inner surface 4a of outer pipe 4 by spacers, labeled 12a and 12b, in the form of protective rails running substantially radially, as illustrated in FIGS. 2 through 4, over the entire length occupied by monitoring means 1. More specifically, spacers 12a form a first set of spacers consisting of two substantially rectilinear metal rails 121, 122 welded to a portion of outer wall 3a of inner pipe 3 and protruding into the annular space 19 between the pipes and into close proximity with the inner surface 4a of pipe 4. More or less diametrically opposed to the first set of spacers is a second set 12b consisting of one rail 123 welded to outer wall surface 3a and likewise extending into the proximity of inner wall surface 4a of pipe 4.

It will be noted that a small clearance has been left between the edge of the various spacers and the inner surface 4a of the outer pipe so as to allow for possible expansion of said spacers under stress.

Spacers 12a, of substantially equal width 1, are wider than the opposing spacer 12b, which has width 1'. The result is to offset the center of inner pipe 3 with respect to outer pipe 4. The axes 23 and 24 of pipes 3 and 4 respsectively are therefore separated by a distance d'. In other words, annular space 19 is made wider on the side accommodating the instruments 9, 10 that make up probe 2, whereas the space on the opposing side is reduced commensurately.

As FIGS. 3 and 4 clearly show, the detector 9, with its cable link 16, and source 10 are placed between rails 121 and 122.

Referring now to FIGS. 2 and 3, it can be seen that the detector, rendered schematically and labeled with numeral 9, is essentially held against outer surface 3a of inner pipe 3 by metal bands or hoops 18. The hoops encircle pipe 3 and detector 9, passing through openings 31, 31' in the various rails 121, 122, 123.

Advantageously, edge 32 of each opening 31 is bevelled so as to facilitate the passage of the band.

It will be noted that in FIG. 2 only two hoops have been shown passing through the corresponding openings at two different levels along detector 9. However, the number of hoops may be adapted to the fastening strength required.

In order to prevent cable link 16 from becoming stuck between pipes 3 and 4, it may be useful to provide other fastening bands (not shown) at several points along the path of the cable from detector 9 to the receiving/analyzing unit 17 at the surface.

As shown in FIGS. 2 and 4, the rigidity and adherence of the rails, particularly rails 121 and 122, are enhanced through the use of reinforcers 33 welded to the rails and to the outer wall surface 3a of pipe 3. Said reinforcers are set at several points along the rails. They may be provided at the upper and lower ends of the rails and at the level of the probe and/or detector.

In the application shown, source 10 is a radioactive source. In itself known, it consists substantially of a radioactive pellet 22 emitting directed radiation, set within a holder 29. Said holder may be screwed into a case 25, with appropriate seals 35 to keep it leaktight. Case 25 is equipped with a radiation slot or window 28 and is itself screwed into a mounting bracket 26 that has been made integral with the outer surface 3a of pipe 3, e.g., by weld beads 36, 36'. Appropriate seals 35 and 27 ensure that the assembly thus constituted will be free of leaks (FIG. 4).

Window 28 is used first for the installation of pellet 22 and its holder 29, and second for focusing the radioactivity of the source onto fluids 30 and/or 50, which surround the outer surface 4b of pipe 4. We shall return to this characteristic in the source of explaining how the newly invented probe works. In any event, in order to prevent any unwanted direct radiation from source 10 from reaching detector 9 (i.e., radiation that has not been reflected by at least one of fluids 30, 50), a screen 34 has been placed between these two components. Screen 34 may consist of a sufficiently thick mass of metal, formed, for example, from a series of weld beads. Said mass extends transversely between rails 121 and 122, covering substantially their entire width 1.

In the example presented in FIGS. 2 through 4, it will be noted that the dimensions of source 10 are slightly larger in cross-section than those of detector 9. It will be understood that in this case, the radial extension of rails 121 and 122, between which source and detector are positioned, should be adapted to the respective dimensions of the latter. In particular, the two rails might spread out slightly below screen 34, i.e., between the screen and the lower end of the rails.

The structure of detector 9 will not be described, since it does not constitute one of the objects of the invention. It will simply be noted that the detector comprises a sensor or receiver (labeled with numeral 38 in FIG. 2) that picks up the signals emitted by the radioactive source, and a processing circuit, labeled 35, that sends the data received to receiving/analyzing unit 17 through cable link 16.

In one particular application, provided by way of nonlimitative example, monitoring means 1 as described above might have the dimensions set forth below.

It should first be noted, however, that pipes 3 and 4 are each formed from a series of pipes placed end to end and joined by any appropriate means, a fact that is in itself known.

It should also be noted that in order to facilitate the accommodation and installation of the instruments making up the means of the invention, inner pipe 3, particularly the section onto which the instruments are fastened (notably the source and detector), has a diameter D that is slightly less than the diameter D' of the adjacent sections of inner pipe 3 to which it is joined at its two ends 36 and 37.

Diameter D may be approximately 100 mm, and D' approximately 120 mm.

On the other hand, in this application the outer pipes all have the same diameter, which may be approximately 200 mm. The thickness of pipes 3 and 4 is approximately 10 mm.

It should also be noted that the offset d' between the centers of pipes 3 and 4 is advantageously on the order of 20 mm. The width 1 of the rails or spacers making up set 12a would therefore be approximately 50 mm overall, whereas the width of the opposing, complementary spares 12b would be approximately 20 mm overall. The length of pipe over which the rails extend is substantially 200 to 250 cm, and preferentially about 230 cm.

The operation and (briefly) the installation of the above newly invented monitoring means will now be described.

First to be discussed will be the installation of the means of the invention in the context of the particular application covered here, namely the process of monitoring an interface 6 between two liquids 30 and 50 in the course of forming a salt cavity by leaching, and particularly by reverse leaching.

First, at the beginning of the leaching operation, outer pipe 4 is put into place through shaft 5, by setting pipe sections of the same diameter end on end and sinking them in the direction of cavity 8.

Next, after having prepared the special inner pipe 3 that is to support the monitoring means, i.e., after having placed detector 9 and source 10 between rails 121 and 122, and fastening all of the latter by means of bands and welds respectively, a series of inner pipes 3 is sunk into pipe 4.

More specifically, a sequence of pipes 3 of diameter D' is set end to end. At a specific, predetermined point in this chain, special inner pipe 3, with diameter D, is inserted. It will be understood that special inner pipe 3 is inserted in such a way that, once in place underground, measuring probe 2 is positioned at the level of one and/or the other of fluids 30, 50 and near the point at which one seeks to monitor the position of interface 6.

Of course, cable link 16 has been sunk as well.

Understandably, the measuring probe is advantageously deployed at a predetermined and fixed depth throughout the excavation. Care should preferentially be taken to see that no two adjacent outer pipes 4 will be joined in the space between source and detector, since the joint might interfere with the propagation of the radiation or signals emitted by the source.

Once in place, monitoring probe 2 can be connected to station 17, the receiving and analyzing unit.

The monitoring means are now operational.

Readings are taken of the signals received by detector 9 after being emitted by source 10 and at least partially reflected by said fluids 30, 50. The position or position of interface 6 is computed from the signals received, which vary as a function of the relative position of interface 6 and measuring probe 2.

More specifically, care must be taken to maintain a vertical separation d between source 10 and detector 9. If cesium 137 were used as the radioactive source, said distance d might be between 40 and 60 cm, and preferentially about 50 cm. Thus, if the relative position of interface 6 and probe 2 is such that emitting source 10 and detector-receiver 9 are both located below the level of the interface, as in FIG. 5A, detector-receiver 9 will receive signals of a certain type, the product of at least partial reflection [of the signals proceeding from the source 10] by the elements making up fluid 30 only.

On the other hand, as shown clearly in FIG. 5C, if detector and source are both above the level of interface 6, the signals emitted by source 10 will be wholly or partially reflected solely by fluid 50, and detector-receiver 9 will therefore pick up signals of a type distinct from those registered in FIG. 5A.

FIG. 5B is an intermediate arrangement in which source 10 is located under interface 6, i.e., opposite fluid 30, whereas detector 9 lies above interface 6, opposite fluid 50. It will be understood that in this case, the signals picked up by receiver 9 will lie between the two extreme signal levels corresponding to FIGS. 5A and 5C, since in this case the signals will have been reflected through the constituents of both fluids 30 and 50.

The analysis of the signals received by detector 9 consists of counting the number of pulses received over a given period of time. In other words, the frequency of the reflected signals is measured as a function of time. It will therefore be understood that the measurement will vary depending on whether the emitted signals are reflected solely by liquid 30, in this case brine (FIG. 5A); solely by the fluid 50 that floats on the surface, i.e., fuel oil (figure 5C); or by both of the fluids, brine and fuel oil (FIG. 5B).

It is further noted that in intermediate FIG. 5B, the frequencies obtained are representative of the proportion of each of the two fluids 30, 50 present in the zone of measurement at a given moment.

The process described above therefore makes it possible to determine the position, or changes in the position, of an interface, enabling an operator to track the progress of an excavation. The interface rises toward the surface as the cavity develops.

Returning one last time to FIG. 2, it will be noted that offset d' between the centers of pipes 3 and 4 is useful particularly at the level of the special inner pipe 3 upon which the probe is mounted. Therefore, arrangements could be made for the complementary sections of pipe 3 on either side of special pipe 3 to have substantially the same axis as axis 24 of outer pipes 4. In such a case, as is known, ends 36 and 37 would be substantially conical in shape, allowing simultaneously for the eccentricity (at 23) of the special pipe 3 carrying the probe, and for the essential coaxiality (at 24) of outer pipe 4 and the rest of the sections of pipe 3.

We claim:

1. A system for monitoring the position in a cavity in the earth of an interface between first and second immiscible liquids, said second liquid having a higher density than said first liquid, said cavity being provided with an access shaft for adding and removing said first liquid from said cavity, said system comprising:

(a) a first pipe extending through said access shaft for introducing said second liquid into said cavity;

(b) a second pipe extending through said access shaft for removing said second liquid from said cavity, one of said first and second pipes being positioned within and separated from the other to form inner and outer pipes with a space therebetween;

(c) a probe positioned in said space between said pipes and within said cavity, and operatively connected to a surface station, said probe comprising a source for emitting signals toward at least one of said first and second liquids in said cavity, and a detector for receiving at least a portion of the signals emitted by said source;

(d) fastening means securing said probe against the outer surface of the inner pipe;

(e) a screen mounted between said source and said detector for blocking signals emitted from said source directly toward said detector; and, (f) spacers mounted on said inner pipe within said space between said inner and outer pipes to provide a clearance between said probe and said outer pipe.

2. A system in accordance with claim 1 wherein said fastening means comprise:

at least one band encircling and gripping said inner pipe and said detector; and, a weld bead that fastens said source against the outer wall of the inner pipe.

3. A system in accordance with claim 1 wherein said spacers are positioned around the inner pipe in two sets that are substantially diametrically opposed, with the spacers of the first set being wider than those of the second so as to create an offset between the centers of the two pipes, the axes of which are substantially parallel.

* * * * *

UNITED STATES PATENT AND TRADEMARK OFFICE
CERTIFICATE OF CORRECTION

PATENT NO. : 4,833,321
DATED : May 23, 1989
INVENTOR(S) : Jean-Claude Lioret, et al.

It is certified that error appears in the above-identified patent and that said Letters Patent is hereby corrected as shown below:

Column 1, line 10, change "of" (first occurrence) to --or--.

Column 2, line 51, after "between" change "the" to --two--;

line 63, change "he" to --the--.

Column 3, line 58, change "respsectively" to

--respectively--.

Column 4, line 38, change "source" to --course--.

Column 5, line 24, change "spares" to --spacers--;

line 68, after "position or" insert

--changes in--.

Signed and Sealed this

Sixth Day of March, 1990

Attest:

JEFFREY M. SAMUELS

*Attesting Officer*   Acting Commissioner of Patents and Trademarks